Figure 1:
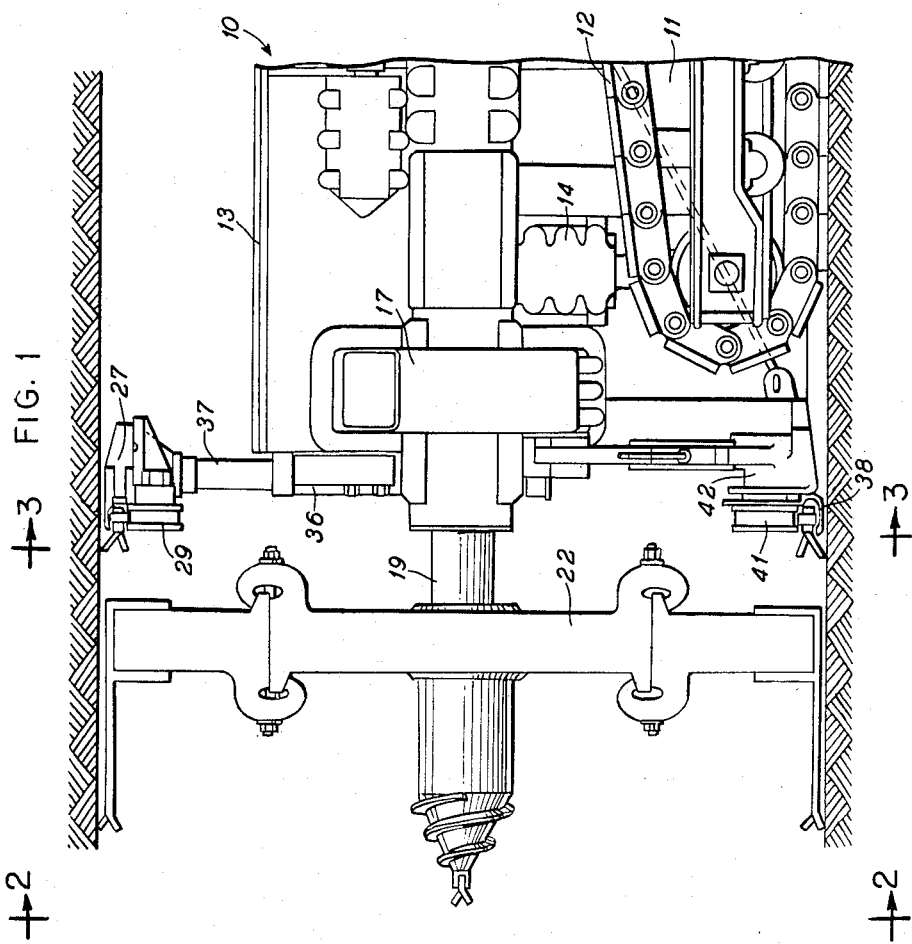

Re. 24523

April 24, 1956  J. S. ROBBINS  2,743,093
MINING MACHINE

Original Filed Jan. 4, 1952  3 Sheets-Sheet 1

INVENTOR:
JAMES S. ROBBINS
BY
Murray A. Gleesm
ATT'Y

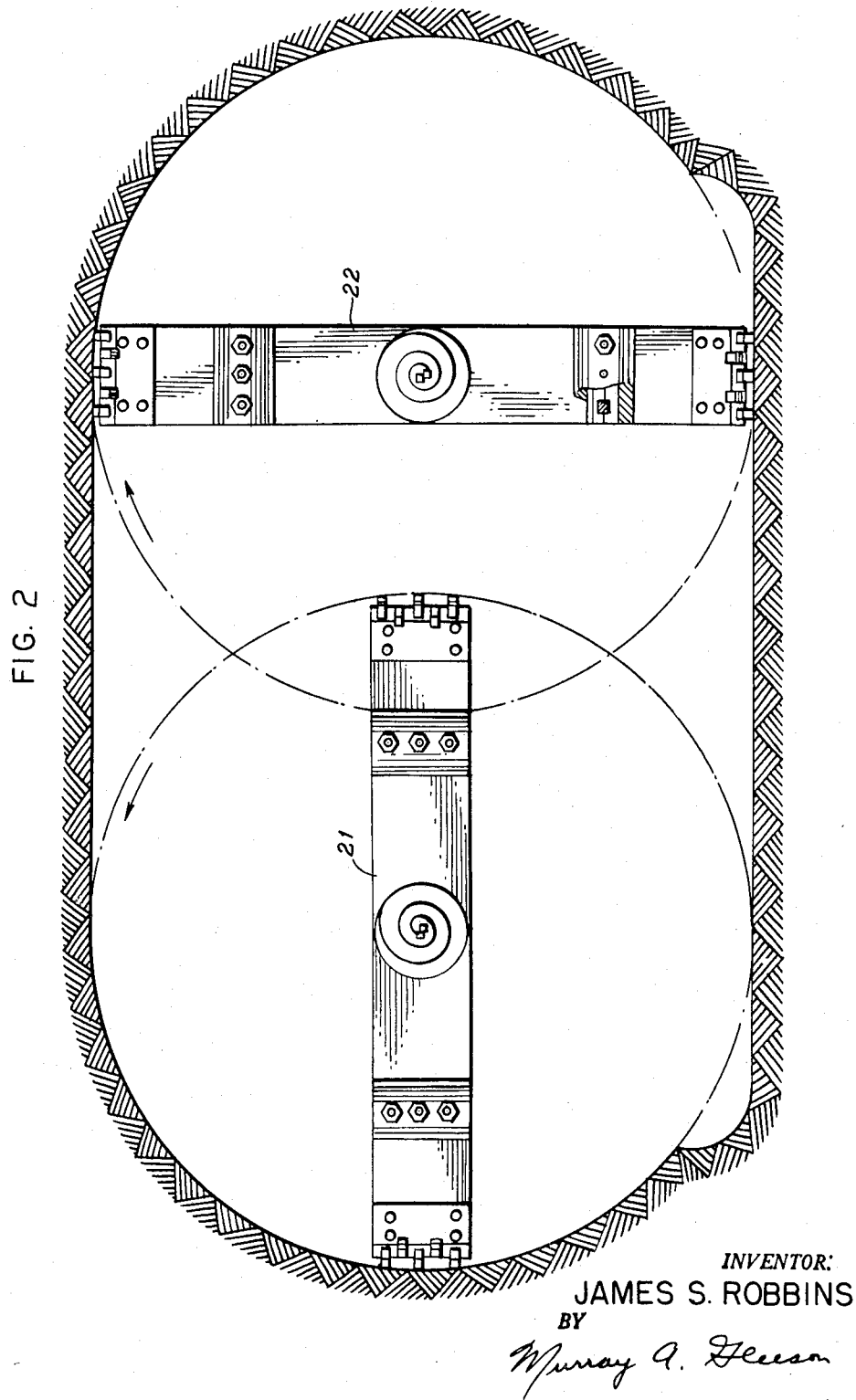

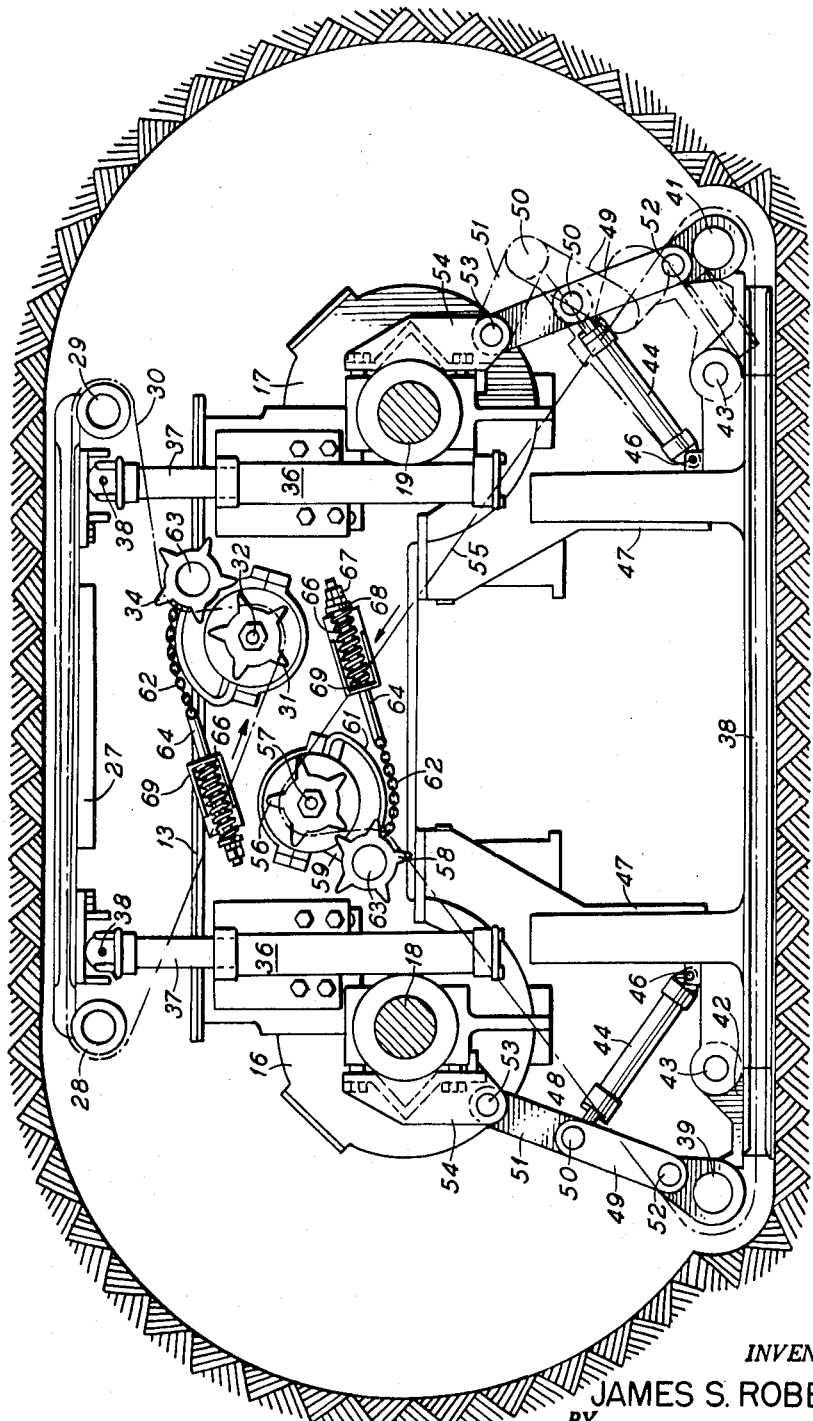

United States Patent Office 2,743,093
Patented Apr. 24, 1956

2,743,093

MINING MACHINE

James S. Robbins, Chicago, Ill., assignor to Goodman Manufacturing Company, Chicago, Ill., a corporation of Illinois Original application January 4, 1952, Serial No. 264,880, now Patent No. 2,705,624, dated April 5, 1955. Divided and this application June 30, 1954, Serial No. 440,375

2 Claims. (Cl. 262—7)

This invention relates generally to mining machines of the general type having a pair of boring arms for cutting a pair of overlapping contiguous bores in a seam of coal or the like, and particularly to a slack take-up device for the endless cutter chains for cutting the cores resulting from the action of the boring arms in cutting such overlapping bores.

One of the principal objects of this invention is to provide a simple slack take-up device for the upper and lower cutter chains, particularly when the guides therefor are retracted.

Other objects and important features of the invention will be apparent from a study of the following specification taken with the drawings, which together show a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown and described, such other embodiments being intended to be reserved especially as they fall within the scope and purview of the subjoined claims.

In the drawings:

Fig. 1 is a partial side elevation view of a continuous miner having embodied therein the improvements according to the present invention, said view being adjacent the forward portions of the machine only;

Fig. 2 is a front elevation view of the machine shown in Fig. 1 said view being taken in the direction of the arrows 2—2 of Fig. 1; and Fig. 3 is a front elevation view taken along the line 3—3 of Fig. 1 and looking in the direction of the arrows, showing the upper and lower chain guides and the endless cutter chains arranged to move on said guides, and the slack take-up devices therefor forming the improvement on the machine of the general type referred to herein.

Referring now particularly to Fig. 1 of the drawings, there is shown the forward portion of a continuous miner indicated generally by the reference numeral 10. Such a miner includes a main frame 11 mounted for movement upon a pair of endless crawler treads 12. The main frame 11 forms a support for an auxiliary frame and drive housing 13 mounted for up and down movement in a vertical direction with respect to the main frame 11 by means of lifting cylinders 14. Other cylinders, not shown, are arranged to give tilting movement to the housing in vertical plane so as to accommodate pitching of a seam of coal or the like.

The drive housing 13 includes a pair of laterally spaced gear housings 16 and 17 which respectively have extending therefrom drive shafts 18 and 19 for boring arms 21 and 22, see also Fig. 2. Boring arms 21 and 22 are driven in timed relationship in opposite directions by means of a gear train contained within the drive housing 13 and the spaced gear housings 16 and 17.

The aforesaid action of the boring arms 21 and 22 in cutting a pair of overlapping contiguous bores leaves behind an upper core and a lower core. In order to remove the cores resulting from the action of the boring arms 21 and 22 endless cutter chains are provided having a path of travel to the rear of the boring arms as seen in Figs. 1 and 3.

To this end, see particularly Fig. 3, there is provided channel-shaped upper cutter chain guide 27 having an idler sprocket or shoe 28 mounted at the left end thereof and a similar idler sprocket or shoe 29 mounted at the right end thereof. An endless cutter chain 30 arranged to travel in the guide 27 is driven by a driving sprocket 31 mounted on a shaft 32 extending from a front wall of the drive housing 13. The endless chain 30 is additionally trained about an idler sprocket 34 arranged under conditions as will appear as this specification proceeds to move in a partially orbital fashion with respect to the driving sprocket 31 so as to at all times take up the slack in the endless cutter chain 30 and to impose the proper amount of tension thereon at all times.

Cutter chain guide 27 is arranged to be moved vertically by means of a pair of laterally spaced lifting cylinders 36, 36 which are mounted on the forward wall of the drive housing 13, and behind the plane of the boring arms 21, 22 as seen in Fig. 2. Each of the cylinders 36 has a piston 37 which is connected by a pin 38 to the upper chain guide 27, see Fig. 3.

As seen in Fig. 3, there is also provided a similar channel-shaped lower chain guide 38 which is arranged to cut the lower core remaining from the action of the boring arms 21, 22. The lower cutter chain guide 38 has mounted at the left end thereof an idler sprocket or shoe 39, and the right end thereof has a similar idler sprocket or shoe 41. The two shoes or sprockets 39 and 41 are each mounted on rock arms 42 and pivoted at 43 to the guide 38. These rock arms 42 are arranged to be rocked to a collapsed position as seen in the right hand part of Fig. 3 by means of a cylinder 44 which is connected pivotally at 46 to a downward extension 47 from the drive housing 13. The cylinder 44 has a piston 48 which is connected to the point of hinged connection 50 of a pair of links 49 and 51, link 49 being pivotally connected at 52 to the rock arm 42 and the link 51 being pivotally connected at 53 to a bracket 54 extending from each gear casing 16 and 17.

As seen with respect to Fig. 3, the idler sprockets or shoes 39 and 41 are arranged to be rocked to collapsed position when fluid is admitted to the cylinders 44, the two links 49 and 51 tending to form an acute angle with respect to each other during such application of fluid.

An endless chain 55 is trained around the shoes 39, 41 and across the lower guide 38 and about a driving sprocket 56 mounted on a shaft 57 extending from the front of the drive housing 13. The chain 30 is also trained around an idler sprocket 58 arranged to move in a partial obital fashion with respect to the driving sprocket 56 and is arranged to impose the tension upon the endless chain 55.

The two idler sprockets 34 and 58 which are arranged to move in a partial obital fashion with respect to their respective driving sprockets 31 and 56 will now be described. The description obtaining for the idler sprocket 58 and its support about the driving sprocket 56 will suffice also for the idler sprocket 34, and so the description for the idler sprocket 34 will not be repeated.

The idler sprocket 58 is accordingly mounted upon an arm 59 having a center corresponding to the center of the shaft 57. The arm 59 is also provided with an arcuate surface 61, and a flexible strand 62 is anchored at one end to a stub shaft 63 supporting the idler sprocket 58 upon the arm 59. The flexible strand 62 is connected to a rod 64 encircled by a spring 66 which is adjusted in tension by adjusting nuts 67. One end of the spring 66 abuts a washer 68 bearing against the adjusting nuts 67 and the other end of the spring is bottomed in an essentially U-shaped stirrup 69 which is secured as by welding to the forward wall of the drive housing 13.

When it is desired to remove the machine 10 from the room in which it operates, the upper cutter chain guide is retracted by means of the cylinders 36, 36. The shoes 39 and 41 at the lower cutter chain guide 38 are likewise retracted by means of the cylinders 44, 44. Ordinarily the entire boring means and the lower chain guide may be lifted from the mine floor by means of lifting cylinders 14, as seen in Fig. 1.

Upon such movement of the upper cutter chain bar 27 and the rock arms 42, 42 the idler sprockets 34 and 58 will be urged by the spring 66, which normally tends to elongate to rock the two idler sprockets 34 and 58 in a counter-clockwise direction with respect to their associated driving sprockets 31 and 56, thereby storing or taking up the chain during such retraction of the machine.

From the foregoing description it is believed and readily understood that a simple means has been provided for taking up the cutter chains as may be occasioned by retraction of the upper cutter chain bar and the lower cutter chain bar, the take-up being additionally characterized by imposing at all times the proper amount of tension upon the chain.

This application is a division of my copending application Serial No. 264,880, filed January 4, 1952, for Coal Mining Machines, now Patent No. 2,705,624.

While the invention has been described in terms of a preferred embodiment thereof it is intended that the scope thereof be limited only by the terms of the claims here appended.

I claim as my invention:

1. In a mining machine of the type having a pair of boring arms arranged to cut contiguous bores in a seam of coal or the like, at least one retractable cutter chain guide and an endless cutter chain guided thereby for cutting a cusp remaining from the action of said boring arms, and a driving sprocket for said cutter chain, the improvement in such mining machine which comprises: means for taking up the slack in said cutter chain occasioned by movement of said cutter chain guide to retracted position comprising an idler sprocket, an arm supporting said idler sprocket and mounted for swinging movement, said arm having its center of swinging movement corresponding to the center of rotation of said driving sprocket, a guide upon said arm, said guide having an arcuate surface substantially coincident with the path of travel of said idler sprocket about said driving sprocket, and means for enabling said idler sprocket to move in a take-up direction to take up the slack in said cutter chain at all times, said means comprising a flexible strand secured to said arm and wrapped along said arcuate surface, and a spring connected at one end to said strand and at the other end to said machine for urging said arm together with said idler sprocket in a take up direction.

2. In a mining machine of the type having a pair of boring arms arranged to cut contiguous bores in a seam of coal or the like, at least one retractable cutter chain guide and an endless cutter chain guided thereby for cutting a cusp remaining from the action of said boring arms, and a driving sprocket for said cutter chain, the improvement in such mining machine which comprises: means for taking up the slack in said cutter chain occasioned by movement of said cutter chain guide to retracted position comprising an idler sprocket, an arm supporting said idler sprocket and mounted for swinging movement, said arm having its center of swinging movement corresponding to the center of rotation of said driving sprocket, a guide upon said arm, said guide having an arcuate surface substantially coincident with the path of travel of said idler sprocket about said driving sprocket, and means for enabling said idler sprocket to move in a take-up direction to take up the slack in said cutter chain at all times, said means comprising a flexible strand secured to said arm and wrapped along said arcuate surface, and resilient means connected to said flexible strand and urging said arm together with said idler in a take-up direction.

References Cited in the file of this patent

UNITED STATES PATENTS

| 1,505,940 | Berryman | Aug. 26, 1924 |
| 1,660,520 | Nielsen et al. | Feb. 28, 1928 |
| 1,726,963 | McKinlay | Sept. 3, 1929 |
| 2,280,021 | As Kue | Apr. 14, 1942 |

FOREIGN PATENTS

| 567,964 | France | Dec. 14, 1923 |

OTHER REFERENCES

"Coal Age," May 13, 1926, pages 667–670.
"Mining Congress Journal," October 1938, pages 44 and 70.